United States Patent [19]

Holster

[11] Patent Number: 4,569,806

[45] Date of Patent: Feb. 11, 1986

[54] METHOD AND DEVICE FOR MANUFACTURING AN INFORMATION CARRIER OF A SYNTHETIC MATERIAL HAVING A LAMINATED STRUCTURE

[75] Inventor: Peter L. Holster, Eindhoven, Netherlands

[73] Assignee: U.S. Philips Corporation, New York, N.Y.

[21] Appl. No.: 573,272

[22] Filed: Jan. 23, 1984

[30] Foreign Application Priority Data

Feb. 4, 1983 [NL] Netherlands ............... 8300417

[51] Int. Cl.$^4$ .................... B29D 9/06; B29D 17/00
[52] U.S. Cl. .................... 264/1.3; 264/22; 264/106; 425/110; 425/174.4; 425/436 R; 425/810
[58] Field of Search .............. 264/106, 107, 134, 1.3, 264/22, 259; 425/810, 110, 174.4, 436 R

[56] References Cited

U.S. PATENT DOCUMENTS

| 4,312,823 | 1/1982 | Kraakman et al. | 425/810 |
| 4,315,723 | 2/1982 | Antoine et al. | 425/810 |
| 4,354,988 | 10/1982 | Bricot et al. | 264/106 |

FOREIGN PATENT DOCUMENTS

| 57-163536 | 10/1982 | Japan | 264/106 |
| 57-163535 | 10/1982 | Japan | 264/106 |
| 57-169325 | 10/1982 | Japan | 264/107 |
| WO81/02236 | 8/1981 | PCT Int'l Appl. | |

Primary Examiner—James Lowe
Attorney, Agent, or Firm—Norman N. Spain

[57] ABSTRACT

A method and a device for manufacturing an information carrier of synthetic material having a laminated structure, in which a transparent carrier is provided away from the mould with a resin layer and is then brought to a position opposite a mould with its resin layer facing the mould, after which the carrier is pressed against the mould progressively from a boundary surface of the carrier by means of one or more rollers and at least the part of the carrier located directly behind the roller or rollers is exposed for curing the resin layer, the carrier with the cured resin layer being subsequently removed from the mould and further transported.

11 Claims, 4 Drawing Figures

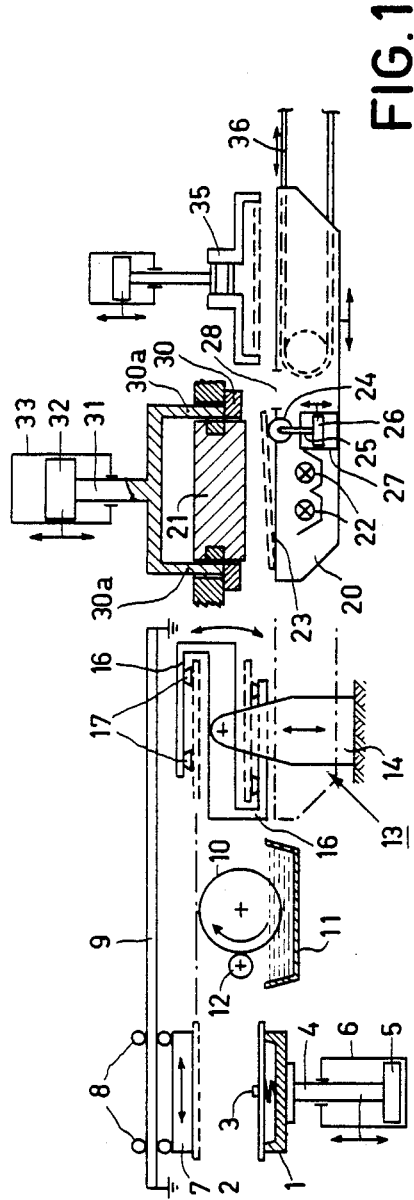
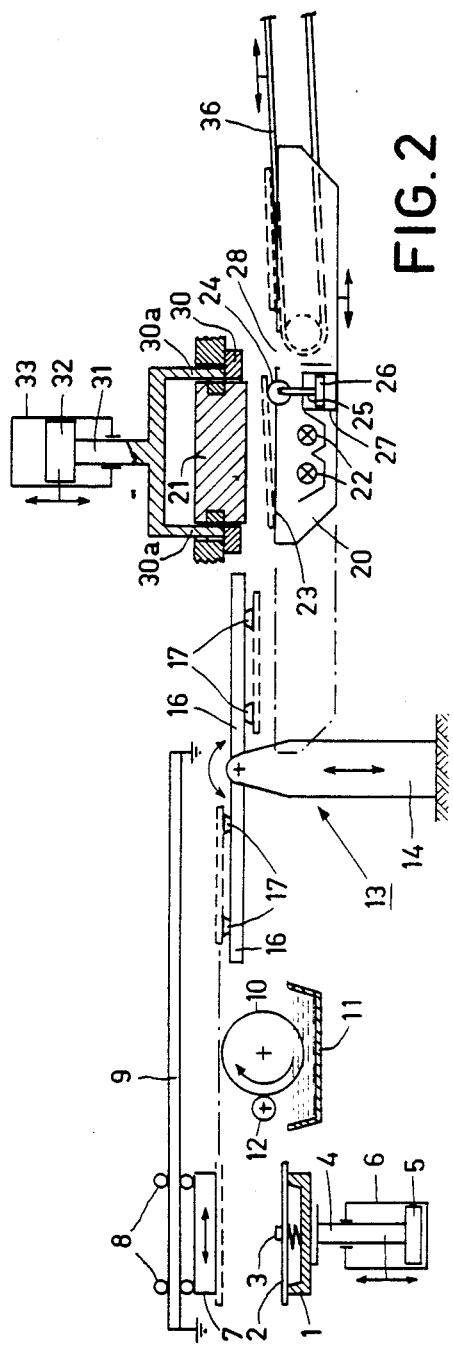

METHOD AND DEVICE FOR MANUFACTURING AN INFORMATION CARRIER OF A SYNTHETIC MATERIAL HAVING A LAMINATED STRUCTURE

The invention relates to a method of manufacturing an information carrier of a synthetic material having a laminated structure, in which a layer of liquid moulding resin is provided between a transparent carrier and a mould surface provided with an information pattern, after which the moulding resin is cured and the assembly comprising the carrier and the layer of cured synthetic resin affixed thereto and provided with an information pattern, is removed from the mould.

Information carriers of synthetic material to which the present invention relates are especially those information carriers which contain information that can be read with a light beam, although information that can be read in a different manner is not excluded.

Information carriers of the kind to which the present invention relates can be manufactured by means of a method in which a photopolymerisable moulding resin is spread as a layer between a mould provided with the negative of the information and a substrate. After curing, the synthetic resin adheres to the substrate and thus constitutes therewith a laminated information carrier.

An example of the above method is described in Dutch Patent Application No. 7,906,117 (PHN.9523) laid open to public inspection.

In this known method, a flat mould is disposed on a flat supporting plate. At the centre of the mould a quantity of liquid moulding resin is deposited, after which a substrate deflected into a domed shape is moved towards the mould. The object of deflecting the substrate into a domed shape is that by subsequent flattening of the substrate the moulding resin is rolled out over the mould surface from the centre without air occlusions occurring. Instead of deflecting the substrate, the substrate may be kept flat and the mould be deflected into a domed shape.

A disadvantage of the known method described above is that all the processing steps are effected successively in co-operation with the mould. This means that the production of information carriers per mould is comparatively low, which consequently causes the cost per information carrier to be high.

A further disadvantage is that it is difficult to meter the moulding resin, with the result that in most cases an excess of moulding resin is used and the excess resin has to be removed in some way or other at the edge of the information carrier. This results not only in the additional cost of removing the excess resin but also the loss of comparatively expensive resin.

Problems of the same kind also arise in the method described in PCT-WO No. 81/02236, according to which a foil-shaped substrate is rolled over a mould by a roller and a quantity of resin is disposed between the substrate and the mould.

The invention has for its object to provide a method of manufacturing an information carrier which is less expensive and requires a smaller quantity of resin than the method previously known.

The method according to the invention is characterized in that the transparent carrier is provided with the layer of resin positioned away from the mould and is then brought to a position opposite the mould with its resin layer facing the mould, after which the carrier is pressed into contact with the mould progressively from a boundary surface of the carrier by means of one or more rollers and at least the part of the carrier located directly behind the roller or rollers is exposed for curing the resin layer and the carrier with the cured resin layer is subsequently removed from the mould.

By first positioning the resin layer away from the mould the advantage is obtained that the time during which the information carrier co-operates with the mould can be short. This leads to lower cost per information carrier by a more economical use of the mould. A further advantage is that the process of positioning the moulding resin away from the mould can be effected with greater accuracy, which leads to a lower consumption of resin, an improved product and moreover saving in cost.

In one embodiment of the method in accordance with the invention, the resin layer is applied to the carrier by passing the carrier over a roller wetted with resin.

The resin layer may be provided on the lower side of the carrier, after which the carrier is rotated through 180° before being introduced into the mould. This has the advantage that any resin dripping off the substrate returns to the resin-applying roller and does not contaminate any other part of the device.

The invention further relates to a device for manufacturing an information carrier of a synthetic material having a laminated structure. This device is characterized in that means are provided for applying a layer of moulding resin to a carrier of synthetic material, transport means are provided for bringing the carrier provided with a resin layer below a mould having an information pattern, in such a manner that the layer of resin faces the mould, and below the mould there is provided a roller which is movable towards the mould and along the mould so as to press first a boundary surface of the carrier and then progressively the remainder of the carrier into contact with the mould, exposure means being arranged below the mould, by which means the carrier pressed against the mould is exposed over a given distance behind the roller.

The means for applying the resin layer may be constituted by a rotatable roller, which at one area cooperates with a resin supply device and at another area can be contacted by a carrier.

In one embodiment of the device according to the invention, in which the carrier is constituted by a single substrate, the substrate contacts the resin-applying roller at the upper side of the roller. This means that the substrate is provided with the resin layer on its lower side. When the substrate is transported further it is inverted through 180° by means of an inversion device so that when the substrate is positioned below the mould the resin layer faces the mould. The mould is arranged with its moulding surface facing downwards in order to limit contamination and damage.

In one embodiment, the inversion devices places the substrate provided with resin on a carriage which is arranged to move in a reciprocatory manner and which brings the substrate below a stationary mould, the carriage carrying a rotatable roller with means for moving the roller towards the mould, after which the carriage moves back and the roller presses the substrate against the mould progressively from a boundary surface of the substrate, a light source being arranged below the mould and the carriage having a screening plate with an opening located directly behind the roller.

In this manner, the substrate is pressed progressively against the mould so that the possibility of the occurrence of air occlusions is small. The light impinging on the substrate directly behind the roller trough the opening in the screening plate uses the resin. Instead of using light, the resin may alternatively be cured by means of heat.

The finished substrate may be pushed away from the mould by means of a ring surrounding the mould, after which further transport can take place, for example, by means of transport chains or ropes.

The ring may be so constructed at its lower side so that it touches the substrate first at a point on its circumference so that the substrate is effectively peeled off the mould.

If the carrier is constituted by a foil of synthetic material, the device according to the invention may be provided with means which are adapted to co-operate with transport holes in the foil and which bring the foil provided with resin below the mould, and below the mould there may be arranged a rotatable frame which carries at least two pressure rollers and in which there are arranged a light source and a screen therefor with two openings which, viewed in the direction of rotation, are located behind the rollers.

In this device, two strips may be located at opposite sides of the mould and arranged to move in a reciprocatory manner for detaching the foil from the mould after the resin has cured.

The invention will be described more fully with reference to the drawings.

FIG. 1 shows diagrammatically in side elevation a device for manufacturing information carriers of synthetic material, in which the starting member is a single substrate.

FIG. 2 shows diagrammatically a device similar to that of FIG. 1 but with a different construction of the mechanism for inverting the substrate and of the device for transporting the finished information carrier.

Figure 3:
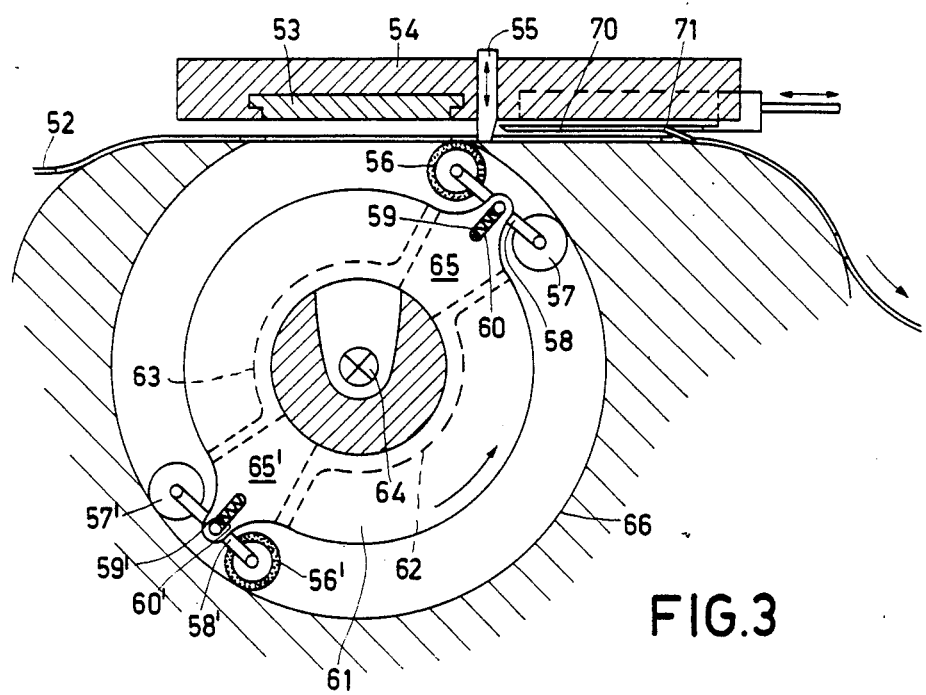
FIGS. 3 and 4 show diagrammatically how a transparent carrier in the form of a foil can be pressed against the mould by means of pressure rollers travelling round a circular track, exposure taking place directly behind each pressure roller.

In FIG. 1, reference numeral 1 designates a holder on which can be disposed a plate-shaped substrate 2 of a transparent synthetic material. The holder 1 is provided with a centering pin 3 which co-operates with the central hole of the substrate 2. The holder 1 is placed on a piston rod 4 which is fixed to a piston 5 adapted to move in a cylinder 6 which can be connected on both sides of the piston 5 to a compressed-air source not shown.

By moving the holder 1 upwards, the substrate 2 is contacted with a pick-up element 7 which can be connected to a source of vacuum so as to pick-up the substrate 2 from the holder 1.

The pick-up element 7 is supported by rollers 8 on a guide 9 along which the pick-up element 7 can be moved in a reciprocatory manner by means of a drive not shown.

During this movement the substrate 2 is contacted with a roller 10 for applying resin. The roller 10 rotates and passes at its lower side through a trough 11 containing moulding resin. A roller 12 ensures that the film of moulding resin on the rolling device 10 acquires a uniform thickness.

Subsequently, the substrate 2 reaches a substrate-inversion device 13, with the side of the substrate which is provided with a layer of non-cured resin directed downwards. This inversion device comprises a structure 14 on which a substrate support is rotatably mounted, which support is provided on both sides with a U-shaped framework 16 which is provided with pneumatically actuated devices 17 which can grip the edge of the substrate at four points.

After the substrate has been gripped, the support is rotated so that the substrate 2, now with the layer of moulding resin facing upwards, is located substantially at the level of the upper side of a carriage 20 which is arranged to be moved in a reciprocatory manner by means of a drive not shown.

When the carriage 20 is in the position indicated by dot-dash lines, the substrate 2 is released from the grabs 17 and deposited on the carriage 20.

The carrier 20 then moves to the right (as viewed in FIG. 1) until the substrate 2 is located below a mould 21 fixedly arranged in the device.

A likewise fixedly arranged light source 22 is situated below the fixedly arranged mould.

The carriage 20 is provided with a closed covering plate 23 which screens the light source.

The carriage 20 carries a roller 24 which can be moved upwards through the covering plate 23. For this purpose, the roller 24 is rotatably supported at both sides on a piston rod 25 which is connected to a piston 26 of an air cylinder 27.

As viewed in the drawing, on the right-hand side of the roller 24 the covering plate 23 of the carriage 20 is provided with an opening 28 through which the substrate and the mould can exposed to light from the source 22 when the carriage is moved to the left.

When the roller 24 is moved upwards, the substrate is pressed at its right-hand side against the mould. As the carriage 20 is moved to the left, the substrate is pressed progressively into contact with the mould by the roller 24, and the part of the substrate which is on contact with the mould is exposed to light from the source 22 so that the resin cures. By pressing the substrate progressively against the mould, the formation of air bubbles in the resin layer is effectively prevented.

When the whole substrate has been pressed against the mould and the resin has cured, the substrate adheres to the mould.

In detaching the substrate with the information layer from the mould, a ring 30 is arranged around the mould. This ring can be moved downwards by means of pins 30a, a piston rod 31, a piston 32 and an air cylinder 33, so that the ring 30 presses on the edge of the substrate and detaches it from the mould. The substrate with the cured resin layer then falls onto the right-hand part of the carriage, which is then located below the mould. The lower side of the ring 30 is constructed so that it touches the edge of the substrate first at a point on its circumference, thereby promoting detachment of the substrate from the mould without damage.

The carriage is now again in the position indicated by dot-dash lines.

When the carriage 20 now moves to the right again, a fresh substrate with a layer of uncured resin is brought below the mould 21, whilst the substrate with the layer of cured resin is brought below the pick-up device 35, which grips the finished information carrier and holds it until the carriage 20 has been moved to the left again. The pick-up device 35 then places the information carrier on a conveyor belt or conveyor ropes 36 for further transport away from the device.

Thus, a machine is obtained by means of which at a number of stages several substrates are simultaneously provided on their lower side with a layer of moulding resin and which comprises an inversion device which inverts the substrate and transfers it to a carriage which brings the substrate below a mould, after which the substrate is pressed progressively into contact with the mould and is exposed at the same time. Subsequently, the further transport takes place. In this manner, the production time per information carrier is considerably shorter than with machines in which all the processing steps are effected in co-operation with the mould.

FIG. 2 shows a device which is similar to that of FIG. 1 but with the difference that the substrate support of the inversion device is constructed not in the form of an S as in FIG. 1 but with a flat framework 16 on which the grabs for gripping the substrate are mounted. Further, the conveyor 36 is provided with two or more conveyor ropes which extend obliquely upwards through slots in the upper side of the carriage 20. Thus, when the carriage is moved to the right, a substrate disposed thereon automatically comes to lie on the conveyor ropes 36. The pick-up device 35 is consequently dispensed with.

In the machines shown in FIGS. 1 and 2, the single substrate provided with moulding resin is pressed progressively into contact with the mould by means of a roller mounted on a reciprocating carriage, exposure and curing being effected directly behind the roller.

Instead of mounting the roller on a reciprocating carriage, it is alternatively possible to mount the roller in a rotating frame.

Figure 4:
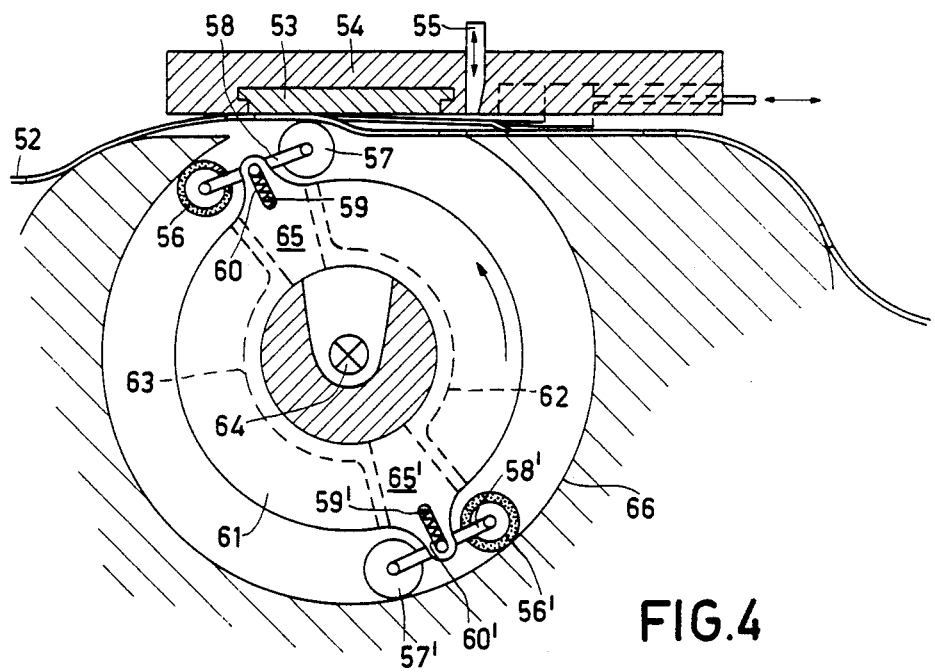

This is shown in FIGS. 3 and 4, in which only the part of the machine comprising the mould etc. is illustrated and in which, by way of example, an information carrier of a synthetic material in the form of a transparent foil of synthetic material is used.

To the left of the part of the device shown, there is again provided a device (not shown) which applies a layer of moulding resin to the upper side of the foil 52 by means of a roller. Instead of using a roller, the resin may alternatively be applied by other methods, in which only those parts of the foil which are later pressed from the foil as information carriers are provided with resin.

The device comprises a mould 53 which is fixedly arranged in the frame 54 of the device.

The foil 52 is provided on both sides with a clock track of holes not shown, engaged on either side by a centering pin 55 when the foil is in a position in which it can be pressed against the mould.

The foil is pressed against the mould 53 by pressure rollers 56 and 56'. Each roller 56 and 56' and an associated further roller 57 and 57', respectively, are rotatably mounted on a lever 58 and 58', respectively, which is pivotally mounted and resiliently supported by a spring 59 and 59', respectively, in a radial slot 60 and 60', respectively, in the flanges 61 of a drum, which flanges are interconnected by drum portions 62 and 63.

A light source 64 is fixedly arranged inside the drum.

The drum portions 62 and 63 screen the light source except at the areas at which the rollers 56 and 56' are located. At there areas openings 65 and 65' are provided between the drum portions, through which openings the beams from the light source can impinge on the mould and on the part of a foil situated in front of it.

The rollers 56,57 and 56',57' roll along the wall 66 upon rotation of the flanges 61, which wall is interrupted at the area of the mould so that at this area the rollers 56 and 56', respectively, urge the foil 52 against the mould 53. Directly behind the rollers 56 and 56', respectively, light from the light source 64 impinges on the transparent foil so that the layer of resin provided between the foil and the mould is cured.

When the rollers 56,57 or 56',57', have passed the mould, the centering pins 55 are lifted and a U-shaped slide with two strips 70 which press on the foil edges at both sides, moves to the left as viewed in the drawings, the strips 70 pressing the foil downwards so that it is detached from the mould.

The strips 70 are further formed with resilient fingers 71 which extend over the two clock tracks and are bent in a manner such that during movement to the left they do not engage in the holes of the clock tracks, but upon movement to the right they do engage in these holes and advance the foil until a new part of the foil lies opposite the mould and detachment can be effected again.

The foil is further transported to the right, after which the parts containing information can be removed from the foil in known manner.

Thus, a machine is obtained which is particularly suitable for the manufacture with very short cycle times of information carriers of synthetic material.

Although in the above description it is assumed in each case that a transparent carrier is used, under given conditions the carrier may alternatively be made of a non-transparent material. The resin can then be cured by heat or by exposure to light through a transparent mould.

What is claimed is:

1. A method of manufacturing an information carrier of a synthetic material having a laminated structure, in which a layer of liquid moulding resin is provided between a transparent carrier and a mould surface provided with an information pattern, after which the moulding resin is cured and the assembly comprising the carrier and the resin layer affixed thereto and provided with the information pattern is removed from the mould, characterized in that the transparent carrier is provided with the resin layer facing away from the mould and is then brought to a position opposite the mould with its resin layer facing the mould, after which the carrier is pressed into contact with the mould progressively from a boundary surface of the carrier by means of one or more rollers and at least the part of the carrier located directly behind the roller or rollers is exposed to cure the resin layer and the carrier with the cured resin layer is subsequently removed from the mould.

2. A method as claimed in claim 1, characterized in that the resin layer is applied to the carrier by passing the carrier over a roller wetted with resin.

3. A method as claimed in claim 2, characterized in that the resin layer is provided on the lower side of the carrier and the carrier is inverted through 180° before being introduced into the mould.

4. A device for manufacturing an information carrier of a synthetic material having a laminated structure, characterized in that in said device means are provided for applying a layer of moulding resin to a carrier of synthetic material, transport means are provided for bringing the carrier provided with a resin layer below a mould provided with an information pattern, in such a manner that the resin layer first faces away from and then faces the mould, and below the mould there is provided a roller which is movable towards the mould and along the mould so as to press first a boundary surface of the carrier and then progressively the remainder of the carrier into contact with the mould, exposure means being arranged below the mould, by which means the carrier pressed against the mould is exposed over a given distance behind the roller.

5. A device as claimed in claim 4, characterized in that the means for applying the resin layer are constituted by a rotatable roller, which at one area cooperates with a resin supply device and at another area can be contacted by the carrier.

6. A device as claimed in claim 5, in which the carrier is constituted by a single substrate, characterized in that the substrate contacts the resin-applying roller at the upper side of the roller.

7. A device as claimed in claim 6, characterized in that the transport means comprise means for inverting the substrate.

8. A device as claimed in claim 7, characterized in that the inversion means places the substrate provided with resin on a carriage which is arranged to move in a reciprocating manner and which brings the substrate below a stationary mould, the carriage carrying a rotatable roller with means for moving the roller towards the mould, after which the carriage moves back and the roller presses the substrate against the mould progressively from the boundary surface of the substrate, a light source being arranged below the mould and the carriage having a screening plate with an opening located directly behind the roller.

9. A device as claimed in claim 8, characterized in that the mould is surrounded by a ring which can push the finished, information-carrying substrate away from the mould.

10. A device as claimed in claim 4, in which the carrier is constituted by a foil of synthetic material, characterized in that the device is provided with means which co-operate with transport holes provided in the foil and which bring the foil provided with resin below a mould, and below the mould there is arranged a rotatable frame which carries two rollers and in which there are arranged a light source and a screen therefor with two openings which, viewed in the direction of rotation, are located behind the rollers.

11. A device as claimed in claim 10, characterized in that the device comprises two strips which are located at opposite sides of the mould for detaching the finished foil from the mould.

* * * * *